United States Patent [19]
Kasbergen

[11] Patent Number: 6,075,296
[45] Date of Patent: Jun. 13, 2000

[54] CONTROL CIRCUIT

[75] Inventor: Paulus Kasbergen, Capelle a/d IJssel, Netherlands

[73] Assignee: Thyssen De Reus B.V., Krimpen aan den IJssel, Netherlands

[21] Appl. No.: 09/158,849

[22] Filed: Sep. 23, 1998

[30] Foreign Application Priority Data

Sep. 26, 1997 [NL]  Netherlands ............................ 1007129

[51] Int. Cl.$^7$ ...................................................... H01H 1/58
[52] U.S. Cl. ............................................ 307/139; 307/113
[58] Field of Search ...................................... 307/139, 112, 307/113

[56] References Cited

U.S. PATENT DOCUMENTS

| 4,002,973 | 1/1977 | Wiesendanger et al. ................. 324/73 |
| 4,525,753 | 6/1985 | Shimeki ...................................... 360/45 |

FOREIGN PATENT DOCUMENTS

| 58-017457 | 2/1983 | Japan . |
| 60-168060 | 8/1985 | Japan . |
| 8-073149 | 3/1996 | Japan . |

*Primary Examiner*—Jeffrey Gaffin
*Assistant Examiner*—Rios Roberto
*Attorney, Agent, or Firm*—Merchant & Gould P.C.

[57]  ABSTRACT

A control circuit (200) mounted on a printed-circuit board comprises a control element (100) having a plurality of inputs ($110_i$). Operating switches (Si) are connected with respective inputs ($110_i$) by print tracks ($12_i$, $30_i$). A signal source (10) generates a plurality of mutually different signals ($\phi_i$) which are passed to the various switches (Si) and whose characteristic is priorly known. In case of, for instance, a short-circuit, a signal of a switch may end up at an input of the control element that does not correspond with that switch, but the control element can recognize this error situation because the received signal then has a wrong characteristic. The control element can then ignore the operating instruction, and/or generate an alarm signal. Thus the risk of incorrect operation by short-circuiting between adjacent print tracks is reduced, and the print tracks can be arranged closer to each other on the printed-circuit board.

9 Claims, 3 Drawing Sheets

FIG. I
PRIOR ART

CONTROL CIRCUIT

FIELD OF THE INVENTION

The present invention generally relates to a control circuit comprising a control element and at least two inputs for receiving operating signals.

The invention has particular, but not exclusive, utility in a control circuit for a lift, and will therefore be described hereinafter for such an exemplary application. It will be clear, however, that the invention is also applicable in other technical fields.

BACKGROUND OF THE INVENTION

At present, it is customary for a control circuit for a lift to be accommodated on a printed-circuit board. The center of that circuit is a control element, typically a microprocessor, controller or the like. The control element controls the functions of the lift and the associated aids, more specifically the lift motor which lifts or lowers the lift, and the lift doors. To that end, the control element processes a large number of operating signals which are presented on respective inputs of the control element, and which originate from respective switches. The term "switch" in this connection is given a broad interpretation, and is understood to include, inter alia, all control buttons in the lift cabin, all control buttons on the various floors, all safety detectors such as door closing switches and cabin position detectors.

The switches are typically of the "make contact" or "break contact" type, i.e., the switches typically have two switch contacts, and they can typically be in two switch states, viz. a first switch state, in which the electrical resistance between those switch contacts is substantially infinite (open switch state), and a second switch state, in which the electrical resistance between those switch contacts is very low (closed switch state).

On the printed-circuit board, terminals are provided, to which the switch contacts of the switches mentioned can be connected by, electrical lines. Those terminals are connected by print tracks to a voltage source and the inputs of the control element. A risk associated with print tracks is their becoming defective; more particularly, there is the danger of short-circuiting between two print tracks, which may cause an operating Eignal to end up at a wrong input of the control element, so that the reactions of the control element no longer correspond with the instructions given by the control buttons and/or the conditions detected by the safety detectors. It will be clear that this may cause fatally dangerous situations.

To reduce these risks, the mutual distances between the print tracks on the printed-circuit board are selected to be fairly great, typically in the order of 4 mm. As a consequence, however, the spatial dimensions of the printed-circuit board have to be rather great. Further, by such an approach, the risks referred to cannot be reduced adjacent the control element proper, because there the mutual distances between the print tracks are determined by the mutual distances between the terminal pins of the control element (IC).

BRIEF SUMMARY

The object of the invention is to eliminate the disadvantages mentioned.

In particular, the object of the present invention is to provide a control circuit of enhanced safety, allowing the mutual distances between the print tracks to be selected smaller.

More particularly, the object of the present invention is to provide a control circuit in which an incorrect signal path, caused by, for instance, short-circuiting or cross talk, can be detected by the control element.

According to an important aspect of the present invention, the various switches are supplied with different feed signals which can be distinguished from each other. The control elem(ent can then recognize by the form of a signal received at an input, whether it is a "correct" signal or an "incorrect" signal caused by, for instance, short-circuiting or cross talk.

BRIEF DESCRIPTION OF THE DRAWINGS

These and other aspects, features and advantages of the present invention will be clarified by the following description of a preferred embodiment of a control circuit according to the invention, with reference to the drawings, wherein.

DETAILED DESCRIPTION OF THE PREFERRED EMBODIMENT

Figure 1:
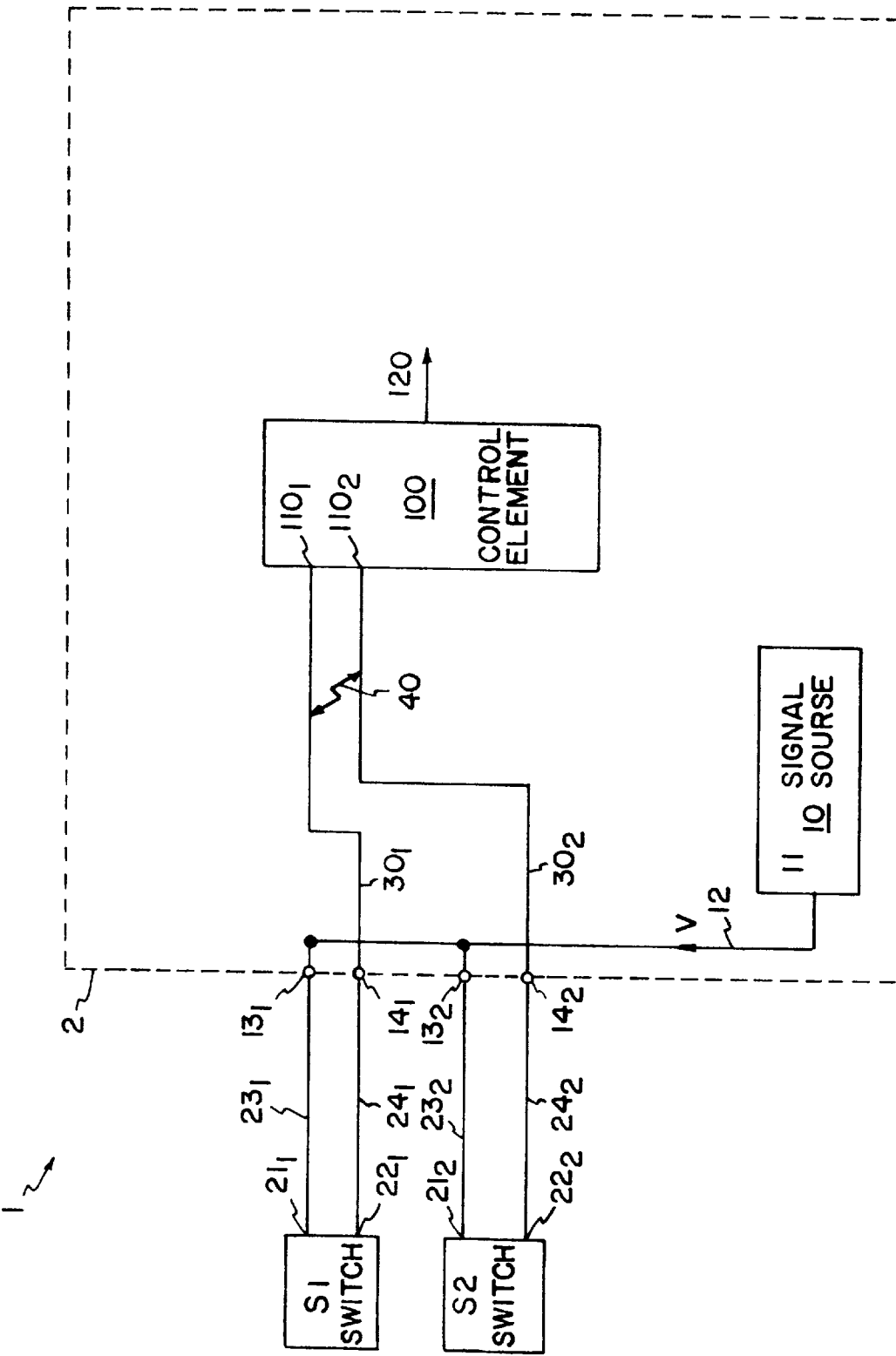
FIG. 1 shows a block diagram of a known control circuit.

FIG. 1 shows a schematic block diagram of a known control circuit 1. Mounted on a printed-circuit board 2 is a signal source 10 with an output 11. Further mounted on the printed-circuit board 2 is a control element 100 having at least one output 120 and having a large number of inputs, of which inputs only two ($110_1$, $110_2$) are represented in FIG. 1. The printed-circuit board 2 is provided with a plurality of signal terminals $13_1$, $13_2$, etc., which are all connected by a print track 12 which in turn is connected with the output 11 of the signal source 10. The printed-circuit board 2 further comprises a plurality of switch terminals $14_1$, $14_2$, etc., which are connected by a respective print track $30_1$, $30_2$, etc., to a respective input $110_1$, $110_2$, etc., of the control element 100.

In a practical application, a first switch S1 is connected to a first signal terminal $13_1$ and a first switch terminal $14_1$. The first switch S1 has a first switch contact $21_1$ which is connected by a line $23_1$, to the first signal terminal $13_1$, and a second switch contact $22_1$, which is connected by a line $24_1$ to the first switch terminal $14_1$. In a first switch state, the switch S1 forms an open connection between its switch contacts $21_1$ and $22_1$, and in a second switch state, the switch S1 forms a closed connection between its switch contacts $21_1$ and $22_1$. Similarly, a second switch S2 is connected to a second signal terminal $13_2$ and a second switch terminal $14_2$. Thus, normally, a large number of switches are connected to the printed-circuit board 2, but that is nct shown in FIG. 1 for the sake of simplicity.

The signal source 10 generates at its output 11 a direct voltage signal V. The control element 100 detects the switch state of the first switch S1 (open or closed) by the presence or absence of the signal V on its first input $110_1$ associated with the first switch S1. Likewise, the control element 100 detects the switch state of the second switch S2 (open or closed) by the presence or absence of the signal V on its second input $110_2$ associated with the second switch S2.

This known circuit has the disadvantages already discussed in the introduction. Suppose that a short-circuit has occurred between the print tracks $30_1$ and $30_2$, as indicated at 40. In that case, the signal V will also reach the second input $110_2$ of the control element 100, associated with the second switch S2, if the first switch S1 is in the closed switch state, even if the second switch S2 is in the open switch state. However, the control element 100 has no possibilities of detecting this error condition, and the control element 100 will act as if the second switch S2 is in the closed switch state.

Figure 2:
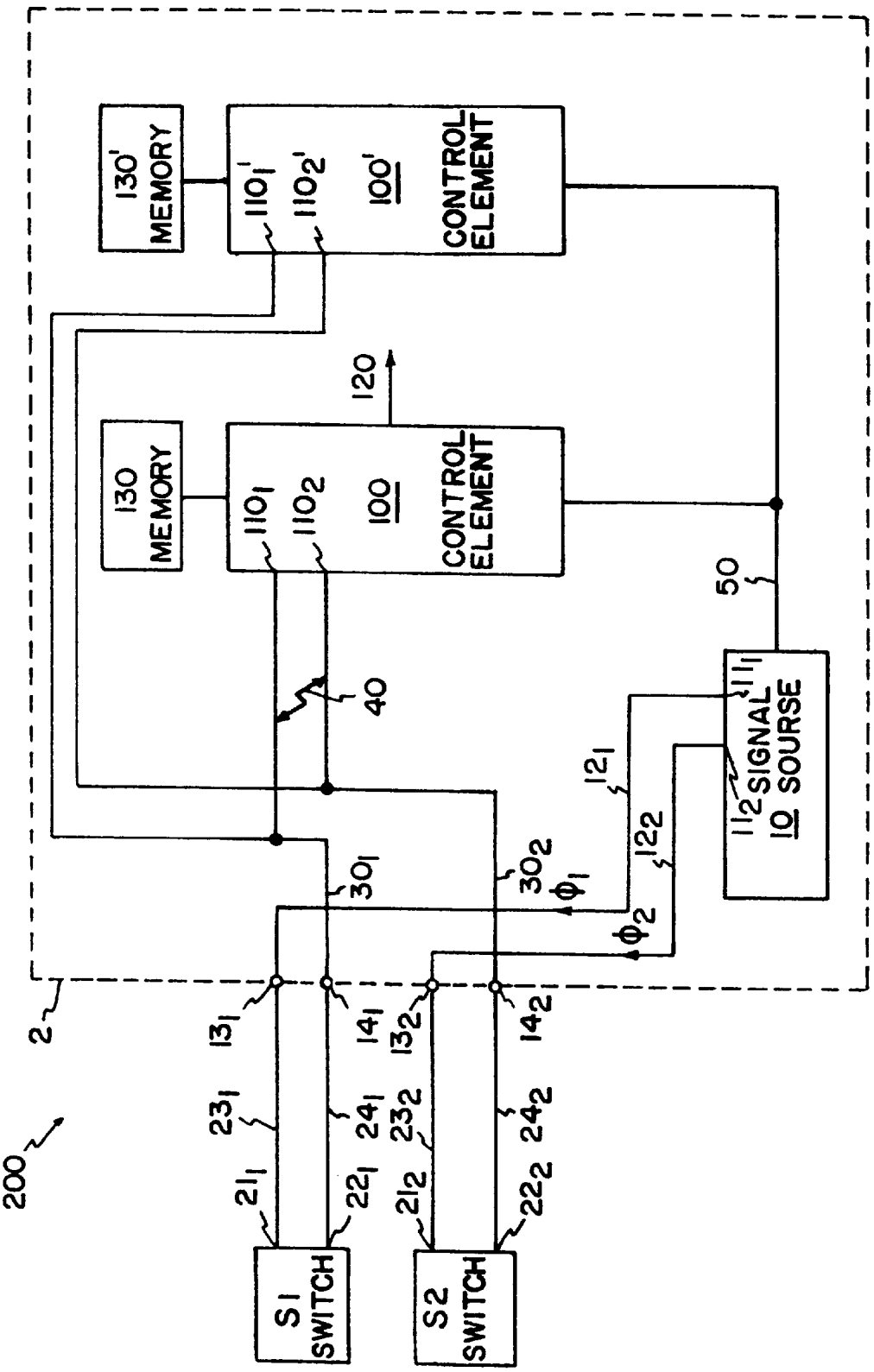
FIG. 2 shows a block diagram of a control circuit according to the present invention.

FIG. 2 shows a schematic block diagram of a control circuit 200 according to the present invention, with equal or similar parts indicated by the same reference numerals as in FIG. 1. The signal source 10 has a plurality of outputs $11_1$, $11_2$, etc., the number of outputs being typically at least equal to the number of inputs of the control element 100. The signal source 10 is arranged for generating at each output $11_i$, a unique output signal $\phi_i$, while the output signals $\phi_i$ and $\phi_{i+1}$ of adjacent outputs $11_i$ and $11_{i+1}$ are different from each other. Preferably, all output signals $\phi_i$ are different from each other.

The first signal terminal $13_1$ is connected by a first print track $12_1$ to the first output $11_1$ of the signal source 10. The second signal terminal $13_2$ is connected by a second print track $12_2$ to the second output $11_2$ of the signal source 10.

The control element 100 detects the switch state of the first switch S1 (open or closed) by the presence or absence of the first signal $\phi_1$ on its first input $110_1$ associated with the first switch S1. Similarly, the control element 100 detects the switch state of the second switch S2 (open or closed) by the presence or absence of the second signal $\phi_2$ on its second input $110_2$ associated with the second switch S2. Now, if a short-circuit 40 occurs between the print tracks $30_1$ and $30_2$, it is still possible that, even if the second switch S2 is in the open switch state, at the second input $110_2$ of the control element 100, associated with the second switch S2, a signal is received if the first switch S1 is in the closed switch state, but that will then be the first signal $\phi_1$. The control element 100 is arranged to analyze the received signal to decide if that received signal corresponds to the signal transmitted by the signal source at its output $11_2$ corresponding with the input $110_2$; if it turns out that this is not the case, the control element 100 will not interpret the received signal as coming from the second switch S2. Thus an incorrect operation is avoided.

The analysis by the control element 100 is possible in that the characteristics of the signals $\phi_i$ transmitted by the signal source 10 are known. Data about these characteristics can, for instance, be stored in a memory 130 associated with the control element 100, as will be clear to those skilled in the art.

Since, according to the present invention, an incorrect operation resulting from cross talk between the print tracks is thus avoided, the print tracks can be positioned closer to each other eLnd the printed-circuit board can have smaller dimensions.

The different signals $\phi_i$ can be realized in different ways. In one possible embodiment, the signals $\phi_i$ can be modulated signals (for instance, alternating voltage signals) of mutually different frequencies; in such a case, the control element 100 may be arranged to examine the frequency components of the signals received at its inputs, as will be clear to those skilled in the art.

In an alternative embodiment, the signals $\phi_i$ can be digital pulse signals having mutually different pulse characteristics and/or pulse frequencies. In such an embodiment, the signal source 10 and the control elements 100 and 100' are also connected by a synchronization clock line 50, likewise illustrated in FIG. 2. In this context, the signal source 10 may further be arranged for generating a synchronization clock signal $\phi_{CL}$, as shown, but it is also possible that the synchronization clock signal $\phi_{CL}$ is provided by a separate clock signal generator mounted on the printed-circuit board 2, but that is not shown for simplicity.

Figure 3:
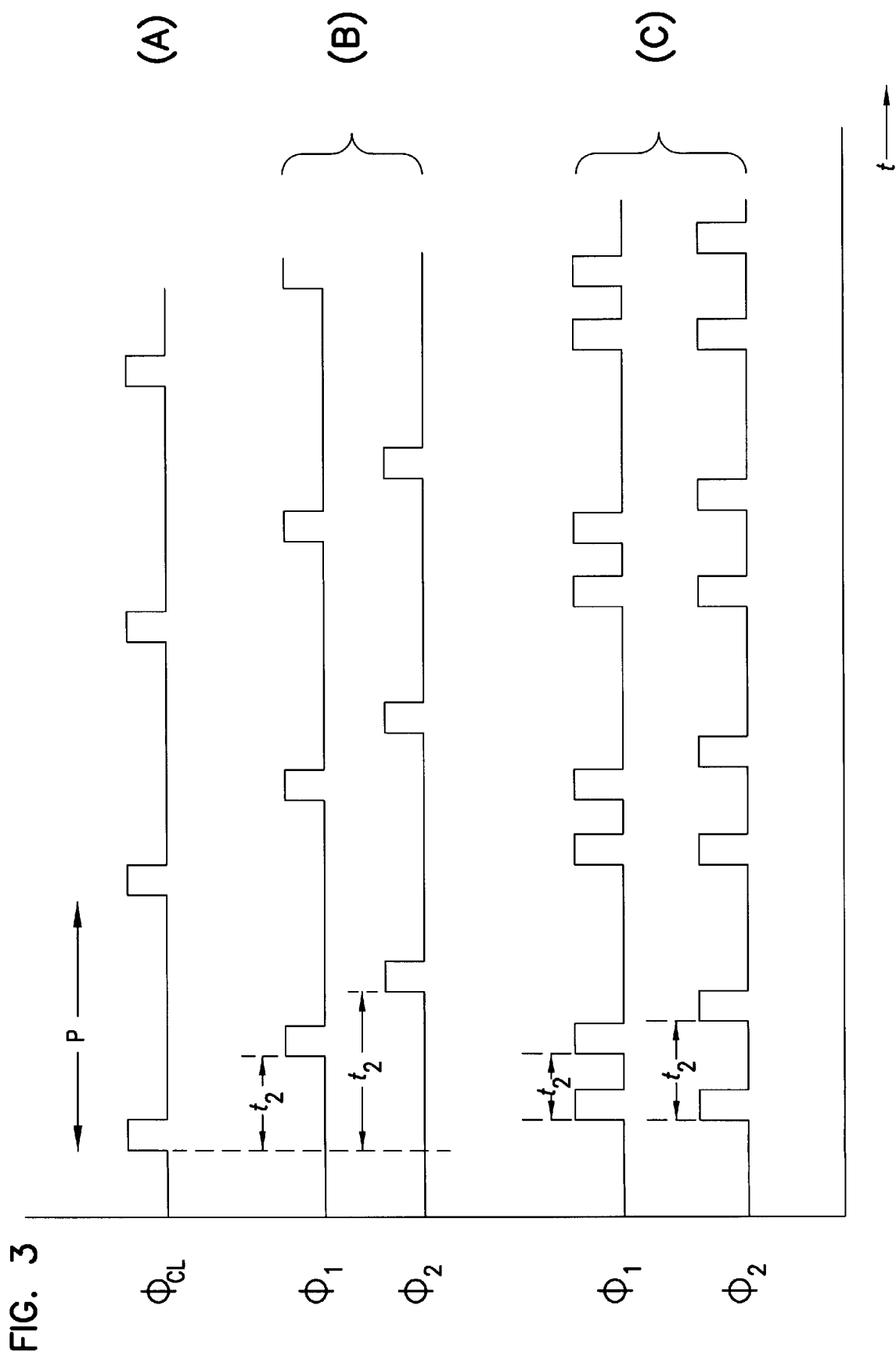
FIG. 3 illustrates different signal forms.

FIG. 3 illustrates different pulse signal forms useful for discriminating between respective signals $\phi_i$.

FIG. 3(A) shows a clock signal $\phi_{CL}$, i.e., a pulse signal that defines a signal period P.

FIG. 3(B) shows two signals $\phi_1$ and $\phi_2$ which contain one pulse per signal period P, the time distance $t_i$ between the clock signal pulse and the signal pulse being characteristic of those signals $\phi_1$ and $\phi_2$.

FIG. 3(C) shows two signals $\phi_1$ and $\phi_2$ which contain two pulses per signal period P, the time distance $t_i$ between those two pulses being characteristic of those signals $\phi_1$ and $\phi_2$.

It will be clear to those skilled in the art that the signals can also be coded in other ways.

To enhance safety, the control element is preferably of double design, as outlined in FIG. 2 (control elements 100 and 100'). The corresponding inputs of the two control elements are connected to each other, so that those control elements will, in principle, process identical signals and hence will generate identical output signals. The operation of the lift is stopped and an alarm is generated as soon as either of the control elements detects an error situation, and/or as soon as the output signals of the two control elements differ from each other.

Summarizing, the present invention provides a cntrole circuit 200 provided on a printed-circuit board, which control circuit 200 comprises a control element 100 with a plurality of inputs $110_i$. Operating switches Si are connected with respeetive inputs $110_i$ by print tracks $12_i$, $30_i$. A signal source 10 generates a plurality of mutually different signals $\phi_i$ which are passed to various switches Si, and whose characteristic is priorly known.

In case of, for instance, a short-circuit, a signal of a switch may end up at an input of the control element that does not correspond with that switch, but the control element can recognize this error situation because the received signal then has the wrong characteristic. The control element can then ignore the operating instruction, and/or generate an alarm signal. Thus the risk of incorrect operation by short-circuiting between adjacent print tracks is reduced, and the print tracks can be arranged closer to each other on the printed-circuit board.

It will be clear to those skilled in the art that the scope of piotection of the present invention as defined by the claims is not limited to the embodiment represented in the drawings and discussed, but that it is possible to alter or modify the represented embodiments of the control circuit according to the invention within the scope of the inventive concept. Thus, for instance, the invention is also applicable if protection from cross talk of signal lines is desired for other reasons.

Further, the present invention is not limited to the field of lifts. In the art, other appliances or processes are conceivable, where a control element must make decisions on the basis cf a plurality of switches, and the present invention can be of use there too. By way of example, a microwave oven can be mentioned.

Instead of mechanical make or break contacts, the switches may also be opto-electrical switches.

Further, it is possible that the signals $\phi_i$ are generated by the control element, in other words, that the control element and the signal source are integrated into a single unit.

I claim:

1. A control circuit, comprising:

at least two switches, each having a plurality of switch states;

a control element having at least two inputs for receiving operating signals;

a signal source having at least two outputs for generating operating signals which are mutually different;

electrically corductive signal paths for connecting the at least two inputs of the control element to the at least two outputs of the signal source via the switches which connect to terminals that are included in the signal paths; and wherein the control element is arranged to generate control signals on basis of the switch states of the switches, and to determine the switch states of the switches on the basis of presence/absence of the operating signals at the inputs.

2. A control circuit according to claim 1, wherein the signal paths comprise print tracks.

3. A control circuit according to claim 1, wherein the control element is arranged to compare characteristics of an input signal received at one of the at least two inputs with previously known characteristics of the corresponding operating signal generated by the signal source, and to interpret the switch state of the corresponding switch as being closed only if the characteristics agree with each other.

4. A control circuit according to claim 3, wherein the control element is arranged to recognize an error condition if at one of at least two input an input signal is received whose characteristics differ from the previously known characteristics of the corresponding operating signal generated by the signal source.

5. A control circuit according to claim 1, wherein the characteristics of operating signals that correspond with adjacent inputs of the control element are mutually different.

6. A control circuit according to claim 5, wherein the characteristics of all operating signals are mutually different.

7. A control circuit according to claim 1, wherein the operating signals are modulated signals having mutually different frequencies.

8. A control circuit according to claim 1, wherein the operating signals are pulse signals having mutually different pulse distances.

9. A control circuit according to claim 1, wherein further a synchronization clock signal ($\phi_{CL}$) is generated, and wherein the operating signals are pulse signals having a characteristic distance between a clock pulse and a signal pulse.

* * * * *